Oct. 14, 1947.

R. G. WOLFE 2,429,008

SPROCKET OR GEAR

Filed Dec. 1, 1945

INVENTOR.
RUSSELL G. WOLFE,
BY
ATTORNEYS

Patented Oct. 14, 1947

2,429,008

UNITED STATES PATENT OFFICE 2,429,008

SPROCKET OR GEAR

Russell G. Wolfe, Indianapolis, Ind., assignor to Diamond Chain & Manufacturing Company, Indianapolis, Ind., a corporation of Indiana Application December 1, 1945, Serial No. 632,268.

5 Claims. (Cl. 74—243)

My invention relates to toothed, annular, power-transmitting elements such as sprockets and gears, and more particularly to a sprocket or gear divided diametrically into two sections.

In many instances gears or sprockets are mounted on rotatable elements from which they cannot readily be removed by axial movement. In such cases, the gear or sprocket is frequently sawed into two halves adapted to be bolted or otherwise secured in complementary relation against the face of a flange on the rotatable element with which they are to be associated. Because of the sawing operation by which the gear or sprocket is divided, there is usually some possibility of relative angular movement of the two halves of the sprocket or gear when they are positioned against the face of the flange to which they are to be secured. Proper meshing of the teeth of the sprocket or gear with an associated chain or other gear requires that the two halves be properly spaced with respect to each other about the axis of rotation.

It is an object of my invention to facilitate the installation of a divided gear or sprocket and to provide means which will positively locate the two halves of such a divided gear or sprocket in proper relation. Another object of my invention is to provide a simple and effective means by which the two halves of a divided gear or sprocket may be interconnected so that they can be handled as a unit.

In carrying out my invention, the gear or sprocket, formed with a central opening and a peripheral series of teeth, is provided with two holes the axes of which preferably are parallel to the axis of the gear or sprocket and disposed generally diametrically opposite each other. The gear or sprocket is then divided into two sections by slots or kerfs extending from each of such holes to the outer periphery and to the central opening of the gear or sprocket. In the preferred embodiment, the two inner slots, which connect the holes with the central opening, communicate with the holes at points located on one side of the plane containing the axes of the two holes, while the two outer slots communicate with the holes on the other side of such plane. When it is desired to assemble the two halves of the gear or sprocket, such two halves are placed in complementary relation, and pins corresponding in size to the two holes are inserted therein.

Figure 1:
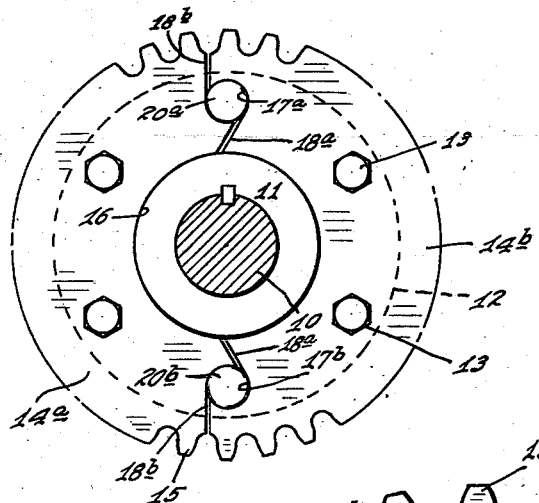
Figure 2:
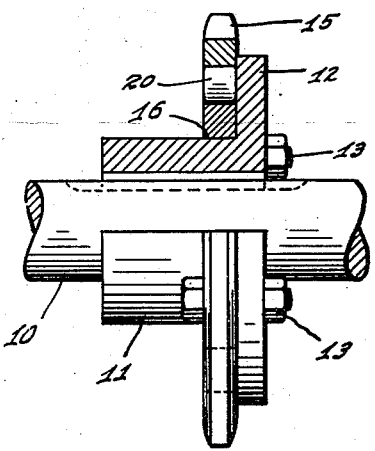
Figure 3:
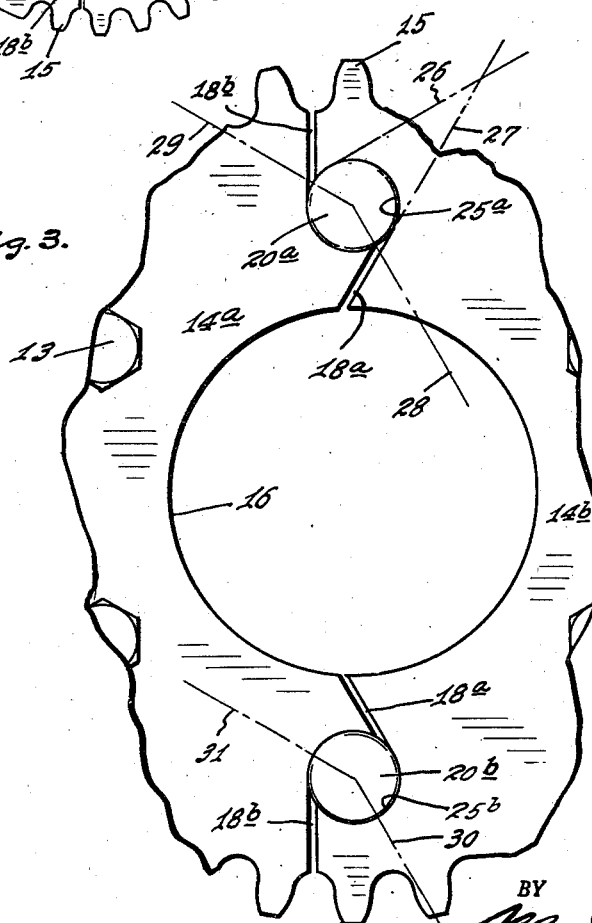

In the accompanying drawing, which illustrates a preferred embodiment of the invention, Fig. 1 is an end elevation and Fig. 2 is a side elevation in partial section showing a sprocket and its mounting; and Fig. 3 is a fragmental diagrammatic view illustrating the principles involved.

In the device illustrated in the drawing a shaft 10 carries a hub 11 provided with an annular flange 12 against the face of which a divided sprocket is to be secured, as by means of bolts 13. The sprocket, which in finished form comprises two sections 14a and 14b, is initially made as a continuous annulus provided with a peripheral series of teeth 15 and with a central bore 16 adapted to fit the body of the hub 11. After the sprocket has been formed as just described, it is provided with two generally diametrically opposite holes 17a and 17b conveniently located approximately midway between the surface of the bore 16 and the roots of the teeth 15. The holes 17a and 17b are connected with the central bore 16 by saw kerfs or slots 18a and with the periphery of the sprocket by kerfs or slots 18b. Such slots, in conjunction with the holes themselves, divide the unitary sprocket into the two sections 14a and 14b. In order that both sprocket-sections 14a and 14b may be applied to the hub 11 by movement in a plane normal to the axis of the shaft 10, it is desirable that the two slots 18a communicate with the central bore 16 at diametrically opposite points. It is also desirable that each outer slot 18b reach the periphery of the sprocket at the bottom of a space between two adjacent teeth, thus avoiding any weakening of a tooth and any interruption of the surface over which driving effort is transmitted between the sprocket and an associated chain.

When the sprocket is to be put in place, the two halves are brought into association with the hub 11 by independent movement, and pins 20a and 20b corresponding in size to the holes 17a and 17b are placed therein as indicated in the drawing. If the slots 18a and 18b are properly arranged, as more particularly set forth below, insertion of the two pins 20 will not only locate the two sections of the sprocket in the proper angular relation, but will also hold them positively in that relation so that the two sections may be handled as a unit. With the pins in place, the assembled sprocket is brought against the flange 12 and secured in place by the bolts 13.

The conditions which must obtain in order that circular pins 20 may hold the two sprocket sections in fixed relative position will be apparent from the somewhat diagrammatic illustration constituting Fig. 3. In that figure, the section 14b is indicated as engaging the pins 20a and 20b over surfaces 25a and 25b respectively. The lines 26 and 27 are intersecting tangents to the surface 25a at its ends. Lines 28 and 29 are drawn from the center of pin 20a perpendicular respectively to the tangents 26 and 27. Lines 30 and 31 extend from the center of pin 20b parallel respectively to the lines 28 and 29. It will be evident that the sprocket-section 14b can move away from pin 20a only in a direction lying between the directions of the tangents 26 and 27 and that to prevent such movement some portion of the surface 25b must lie between the lines 30 and 31. In other words, the surface 25b must contain a portion which faces in a direction directly opposite to that in which some portion of the surface 25a faces. What is true of the surfaces 25a and 25b is equally true of the two pin-engaging surfaces of the sprocket-section 14a; and in consequence, the two pin-engaging surfaces of each sprocket-section must respectively possess portions which face in opposite directions. In addition, each pin-engaging surface of each sprocket-section should include portions lying on opposite sides of the plane containing the axes of the two pins 20a and 20b in order to make it impossible for either section to swing about the axis of one or the other of the pins.

The conditions just set forth are most fully met when the two slots associated with each hole communicate therewith at the ends of the hole-diameter normal to the plane of the hole-axes, the two inner slots 18a communicating with the holes on one side of such plane and the outer slots 18b communicating with the holes on the other side of such plane. However, if the pins 20 fit the holes with reasonable tightness, a considerable departure from the ideal slot arrangement may exist without resulting in any adverse effect.

While I have shown the pins 20a and 20b as extending only through the sprocket and as having no function in holding the sprocket against the flange 12, such characteristics of the pins are obviously not material to their function of locating the two sprocket-halves relative to each other; and it is therefore to be understood that the term "pins" includes bolts or screws which, although they fit the holes 17a and 17b to locate the two sprocket-halves in fixed relative position, also perform other functions such as that of holding the sprocket against the flange 12. It will be obvious not only that the pins 20a and 20b serve to facilitate mounting of the sprocket by securing the two halves together but that they also prevent any relative angular movement of the two sprocket-halves should the securing bolts 13 become loose in service.

I claim as my invention:

1. A power-transmitting element, comprising a circular disk having a central opening and a peripheral series of teeth, said disk being provided with holes on opposite sides of said central opening, with an inner slot extending from each hole to the central opening, and with an outer slot extending from each hole to the periphery of the disk, said holes and slots extending axially through said disk to divide it into two sections, and a pin disposed in each hole, the slots associated with each hole communicating therewith at spaced points whereby the hole-wall is divided into two pin-engaging surfaces located on the respective disk-sections, the two pin-engaging surfaces of each section respectively including portions which face in opposite directions.

2. A power-transmitting element, comprising a circular disk having a central opening and a peripheral series of teeth, said disk being provided with holes on opposite sides of said central opening, with an inner slot extending from each hole to the central opening, and with an outer slot extending from each hole to the periphery of the disk, said holes and slots extending axially through said disk to divide it into two sections, and a pin disposed in each hole, the slots associated with each hole communicating therewith at substantially diametrically opposite points whereby the hole-wall is divided into two pin-engaging surfaces located on the respective disk-sections, the two pin-engaging surfaces of each section respectively including portions which face in opposite directions.

3. The invention set forth in claim 1 with the addition that said inner slots communicate with said central opening at substantially diametrically opposite points.

4. The invention set forth in claim 1 with the addition that each of said outer slots meets the periphery at a point between adjacent ones of said teeth.

5. A power-transmitting element, comprising a circular disk having a central opening and a peripheral series of teeth, said disk being provided with holes on opposite sides of said central opening, with an inner slot extending from each hole to the central opening, and with an outer slot extending from each hole to the periphery of the disk, said holes and slots extending axially through said disk to divide it into two sections, and a pin disposed in each hole; said holes communicating with said inner slots on one side of, and with said outer slots on the other side of, the plane containing the axes of both holes.

RUSSELL G. WOLFE.